United States Patent [19]

Small

[11] Patent Number: 5,786,786
[45] Date of Patent: Jul. 28, 1998

[54] PHOTONIC RADAR DECOY

[75] Inventor: James G. Small, Tucson, Ariz.

[73] Assignee: Raytheon Company, Los Angeles, Calif.

[21] Appl. No.: 818,859

[22] Filed: Mar. 17, 1997

[51] Int. Cl.$^6$ .................... G01S 7/38; G01S 13/76
[52] U.S. Cl. .................... 342/13; 342/9; 342/169; 342/170; 342/171; 342/172; 342/187; 342/15
[58] Field of Search ............... 342/5, 6, 9, 11, 342/12, 13, 169, 170, 171, 172, 15, 187

[56] References Cited

U.S. PATENT DOCUMENTS

| | | | |
|---|---|---|---|
| Re. 35,553 | 7/1997 | Li | 342/13 |
| 3,623,107 | 11/1971 | Holdren, III | 342/5 |
| 4,347,513 | 8/1982 | Schindler | 342/13 |
| 4,419,669 | 12/1983 | Slager et al. | 342/6 |
| 4,471,358 | 9/1984 | Glasser | 342/12 |
| 4,969,819 | 11/1990 | James | 434/5 |
| 5,136,295 | 8/1992 | Bull et al. | 342/15 |
| 5,260,820 | 11/1993 | Bull et al. | 359/145 |
| 5,294,930 | 3/1994 | Li | 342/13 |

*Primary Examiner*—John B. Sotomayor
*Attorney, Agent, or Firm*—David W. Collins; Leonard A. Alkov; Glenn H. Lenzen, Jr.

[57] ABSTRACT

A photonic radar decoy (50) is provided which simulates an aircraft to a radar having an interrogating signal. A plurality of receiving antenna (52, 54, 56, 58, 60) are attached to the decoy (50) with each of the receiving antenna (52, 54, 56, 58, 60) independently capable of receiving the interrogating signal from the interrogating radar system. Each signal received by an antenna (52, 54, 56, 58, 60) is transmitted to a signal combiner and amplifier (82) by delay lines (72, 74, 76, 78, 80). The combiner and amplifier (82) coherently adds the transmitted signals, thereby producing a coherent signal which is amplified and subsequently emitted by a non-directional transmission antenna 106, simulating a dynamic and complex radar signature of an aircraft.

25 Claims, 3 Drawing Sheets

U.S. Patent  Jul. 28, 1998  Sheet 3 of 3  5,786,786

PHOTONIC RADAR DECOY

BACKGROUND OF THE INVENTION

1. Field of the Invention

This invention generally relates to aircraft decoys. More particularly, the present invention relates to an apparatus and method for producing a strong radar return from a small flying vehicle, with the radar return simulating the radar signature of a large high performance aircraft.

2. Description of Related Art

Radar decoys are used to present phantom threats to enemy air defense systems. Currently, this is accomplished with simple radar decoys which employ microwave amplifiers, corner reflectors, or Lunneberg lenses. However, these configurations only provide for a strong point-return which lacks the complex and dynamic components associated with large, maneuvering aircraft. A simple radar decoy utilizing a prior art design is illustrated in FIG. 1.

In the microwave amplifier configuration of FIG. 1, the decoy 20 has receiving antenna (22, 24) in the wings (26, 28) which receive an incoming radar signal 30 from an interrogating radar system 32. The radar signal 30 which is received by the antenna (22, 24) is amplified by a wide band amplifier 34, and retransmitted from a transmitting antenna 36 generally located in the nose 38 of the decoy. In this configuration, a strong single point-return is transmitted by the decoy 20. However, this reflection is insufficient to mislead modern radar systems.

A modern sophisticated radar system can readily distinguish a strong point-return from the signature of a full-size aircraft. Large aircraft have complicated signatures which include features such as extended size with multiple scattering points, scintillation of the signal amplitude as the aircraft maneuvers, and various dynamic effects such as jet engine modulation (JEM).

Therefore, the effectiveness of a decoy against a modern sophisticated radar system may be increased with a complex and dynamic signature return containing the features of a full-size, maneuvering aircraft.

SUMMARY OF THE INVENTION

A radar decoy which produces a complicated return signature is provided by attaching multiple receiving antenna to the fuselage of the decoy. The multiple antenna receive an interrogating signal from a radar system. The signal corresponding to each antenna is then transmitted by a delay line to a coherent combiner. The coherent combiner then adds the transmitted signals producing a single coherent signal which is amplified and subsequently transmitted by a transmission antenna of the decoy. The coherent signal which is transmitted by the decoy thereby contains a complicated signature containing features and dynamic effects of a large-scale aircraft.

DESCRIPTION OF THE PREFERRED EMBODIMENTS

Figure 1:
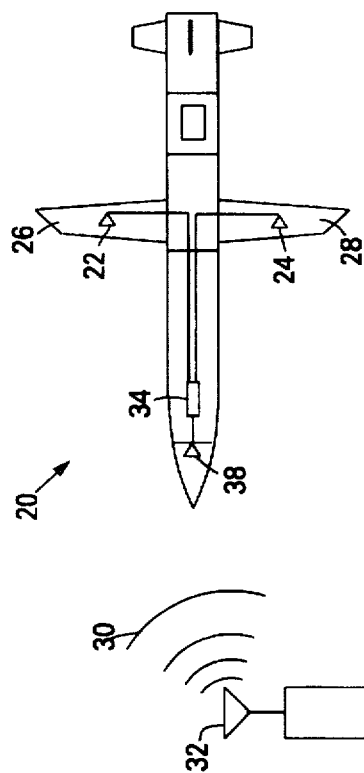
FIG. 1 is an illustration of a prior art radar decoy receiving an interrogating signal from a radar system.
Figure 2:
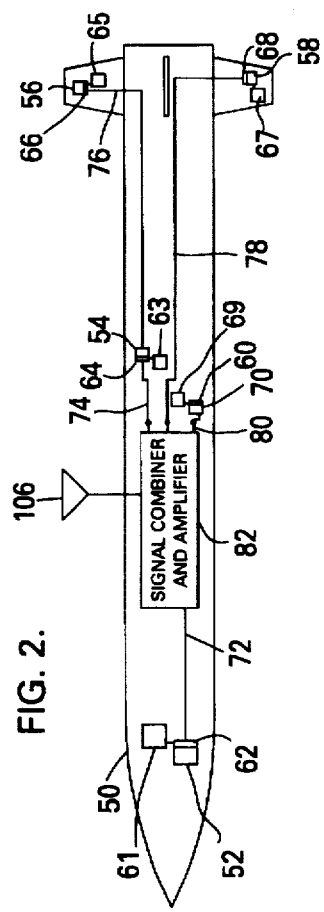
FIG. 2 is an illustration of the photonic radar decoy according to the preferred embodiment of the present invention.

Referring now to the drawings in more detail, FIG. 2 is a photonic radar decoy 50 of the preferred embodiment of the present invention. As shown, multiple receiving antenna (52, 54, 56, 58, 60) are placed about the decoy 50. The antenna may be placed at random locations on the decoy, but are generally attached to the nose, tail, wings, and fuselage, in order to represent the discrete radar scattering points of a larger aircraft.

Each antenna has an electro-optic modulator (62, 64, 66, 68, 70). Each modulator is used to impress a microwave signal received by each antenna (52, 54, 56, 58, 60) on to a light signal generated by diode laser (61, 63, 65, 67, 69), thereby converting the signal received by each antenna into a microwave-modulated light signal. The microwave-modulated light signals corresponding to each antenna are then transmitted through optical fiber delay lines (72, 74, 76, 78, 80) to the signal combiner and amplifier 82. Each of the optical fiber delay lines (72, 74, 76, 78, 80) has a different length. The length difference between the shortest and longest fiber is typically 20 meters, which simulates the extended size of a large aircraft.

The use of electro-optic modulators and optical fiber delay lines provides several advantages. Because the modulators are very efficient, and there is little loss associated with the optical fiber delay lines, amplification of the signal received by a receiving antenna is normally not needed prior to modulator conversion or transmission by the optical fiber delay lines. More importantly, optical fiber delay lines have almost no dispersion for microwave signals.

Unlike microwave delay lines, the optical fiber delay lines will delay all microwave frequencies by the same amount of time, resulting in a line delay based upon the physical length of the fiber, with no distortion, regardless of the interrogating signal waveform. This allows the photonic decoy to be effective against any interrogating microwave signal without requiring a priori knowledge of the interrogating radar waveform or frequency of operation, and therefore provides a significant advantage over electrical delay lines which are restricted to a relatively narrow band of frequencies (such as the single radar S-band) due to frequency dispersion in propagation delays.

Figure 3:
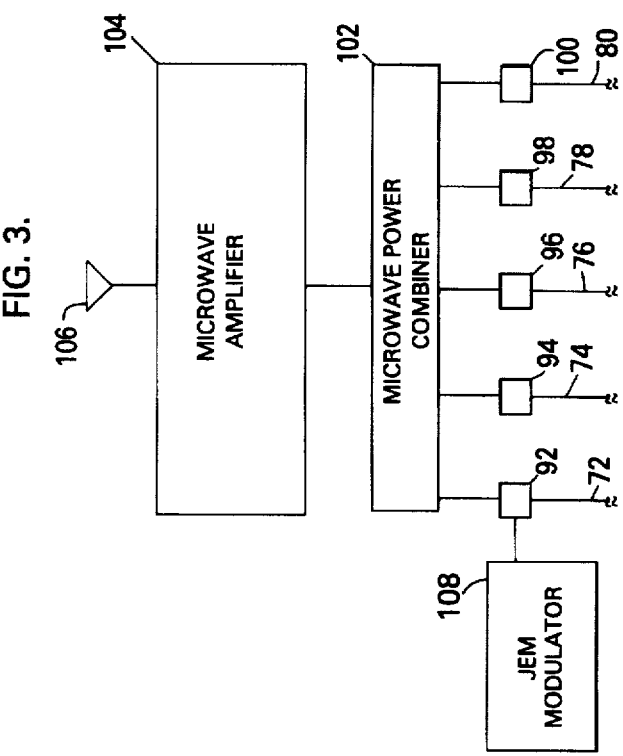
FIG. 3 is a block diagram of the signal combiner and amplifier of the photonic radar decoy of the preferred embodiment of the present invention.

FIG. 3 presents a block diagram of the components which comprise the signal combiner and amplifier 82 (as shown in FIG. 2). Each of the optical fibers delay lines (72, 74, 76, 78, 80) connect an electro-optic modulator (62, 64, 66, 68, 70) to a photo diode receiver (92, 94, 96, 98, 100). The photo diode receivers (92, 94, 96, 98, 100) convert the microwave-modulated light signal back into a microwave electrical signal. These microwave electrical signals are then coherently added with the microwave power combiner 102. The coherent addition of the electrical signals means that the oscillating voltages or currents in the microwave electrical signals are additively combined.

Because the delay lines have different lengths, signals originally received by the decoy at the same time will arrive at the power combiner at slightly different times. Depending upon the microwave frequency, some oscillations will arrive in-phase and reinforce the sum, while other oscillations will arrive partially or completely out-of-phase, resulting in the summation to be diminished.

As the decoy maneuvers during flight, the time delays will change resulting in the coherent summation to vary. This produces a coherently combined signal amplitude which fluctuates in time as the decoy maneuvers, and also fluctuates due to frequency changes in the interrogating radar. This fluctuation, amplified and retransmitted by the decoy, realistically simulates the scintillations in radar cross section which are a characteristic of large aircraft.

It should be noted that the fiber optical delay lines can transmit the signals received by each of the antenna to a n-to-one fiber combiner, which physically combines the fibers into a single optical fiber. After this combination, a single photo diode can then be used to convert the combined light signals into an electrical signal which is amplified and transmitted. In this fashion, it is not necessary to use the signal combiner, but the configuration requires use of a separate laser diode with a separate optical wavelength for each optical delay line in order to avoid unwanted optical interference.

Because of the small size of the receiving antenna, a large portion of the original signal emitted by the interrogating radar system is lost. Furthermore, minor conversion losses exist when the original interrogating microwave signal is converted to a microwave-modulated light signal, transmitted through the optical fiber delay lines, and subsequently converted back into microwave electrical signals. These losses require the combined coherent signal produced by the microwave power combiner 102 to be amplified by the broad band microwave amplifier 104.

The minimum gain required for the amplifier 104 is calculated in order to negate losses associated with the decoy capturing and processing the interrogating signal. In determining this loss, the effective capture area of all the receiving antenna (a), the radar scattering cross section of a large aircraft (A), and the microwave signal losses associated with the decoy (D) (i.e. losses due to less than perfect efficiencies in the modulators, delay lines, photo diodes, power combiner, and retransmitting antenna) are taken into account. The loss (L) in decibels (dB) may be expressed as L=10 log (a/A)+D. In a typical decoy, values for these parameters might be 10 cm$^2$ for a, 10 m$^2$ for A, and −10 dB for D, resulting in losses of −40 dB−10 dB=−50 dB. Therefore an amplifier with a gain of +50 dB should be used to compensate for the indicated losses.

After the coherent signal is amplified by the broad band microwave amplifier 104, the amplified signal is transmitted from a non-directional transmitting antenna 106.

The preferred embodiment also provides a means by which additional dynamic target effects can be added to the return signal. As shown in FIG. 3, a jet engine modulation (JEM) modulator is connected to the photo diode receiver 92. The JEM modulator 108 introduces a JEM modulation onto the microwave modulated light signal which is present on the optical fiber delay line 72. The combined signal of the JEM modulator 108 and optical fiber delay line 72 are then converted by the photo diode receiver 92. This combined JEM signal is then coherently added with the other signals received, and ultimately retransmitted by the non-directional transmitting antenna 106.

The JEM modulator is connected to the photo diode receiver 92 which corresponds to the signal received at the nose of the decoy. In this way, any radar which illuminates the nose will detect the JEM on the return signal, while radar which is illuminating the side of the decoy will not receive a JEM component in the return signal.

In radar decoy configurations, the transmitting antenna must be isolated from the receiving antenna in order to prevent self oscillation. Generally, this antenna isolation is accomplished through cross-polarization. However, with the multiple receiving antenna and an omni-directional transmitting antenna, cross-polarization will usually be insufficient to ensure the isolation required.

Figure 4:
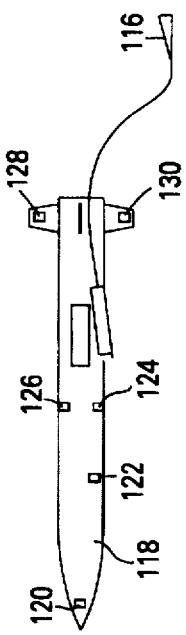
FIG. 4 is an illustration of the antenna isolation configuration of the preferred embodiment of the present invention.

FIG. 4 illustrates a decoy configuration in which the transmitting antenna 116 is towed a modest distance behind decoy 118 in order to achieve adequate isolation between the transmitting antenna 116 and the receiving antenna (120, 122, 124, 126, 128, 130). The distance behind the decoy 118 is calculated such that the signal attenuation between transmitting and receiving antenna exceeds the amplifier gain necessary to produce the decoy signal by a comfortable margin.

Figure 5:
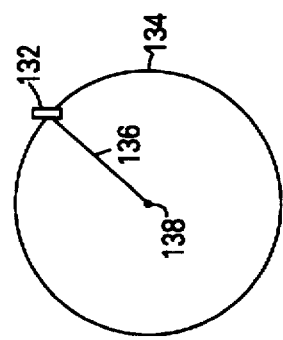
FIG. 5 is an illustration of the parameters used in the calculation of the separation distance for the towed antenna.

In calculating the necessary separation distance between the receiving antenna and transmitting antenna, it should be remembered that the receiving antenna will necessarily receive some fraction of the signal transmitted by the transmitting antenna. For a non-directional transmitting antenna, the transmitted power will be sent equally in all directions, emanating out from the transmitter. Referring to FIG. 5, the receiving antenna 132 will intercept some of the transmission signal due to their capture area (a). The necessary isolation is based upon the geometric ratio of the receiving capture area (a) to the area (A) of a sphere 134 having a radius (R) 136, centered on the transmitting antenna 138. Therefore the isolation ratio is given by the a/A, or in decibel notation, the Isolation (I)=10 log (a/4πR$^2$). With the previous values of a=10 cm$^2$ and a radius (R) of 3 meters, an isolation of −50 dB is achieved, with the negative value indicating a decrease in signal level.

In this illustrative example, the isolation is 10 dB more than the gain required to produce the desired decoy signal, which was previously calculated to be 40 dB. A 10 dB isolation margin is usually adequate, however greater isolation may be achieved by increasing the separation distance R. For example, if the separation distance (R) is increased to 10 meters, the isolation (I) is −60 dB.

Figure 6:
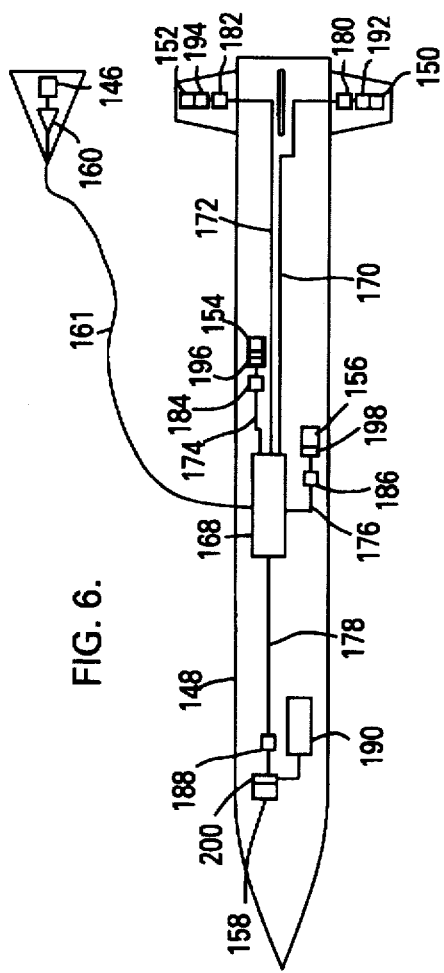
FIG. 6 is an illustration of the preferred embodiment of the present invention which utilizes one receiver and multiple transmitters.

FIG. 6 shows an alternative embodiment of the present invention. This configuration utilizes multiple transmitting antenna and a single receiving antenna. The single receiving antenna 146 is towed behind the decoy 148. Multiple transmitting antenna (150, 152, 154, 156, 158), spaced about the decoy 148, serve to simulate discrete scattering centers on a large aircraft.

The electro-optic modulator 160 converts an interrogating signal, received by the receiving antenna 146, into a microwave-modulated light signal. This microwave-modulated light signal is transmitted via an optical fiber, contained in the tow line 161, to a 1-to-N fiber splitter 168, sending the light signal through optical fiber delay lines (170, 172, 174, 176, 178), to photo diodes (180, 182, 184, 186, 188), which correspond to amplifiers (192, 194, 196, 198, 200) and transmitting antenna (150, 152, 154, 156, 158), respectively.

As with the previously describe embodiment, this configuration will produce the desired scintillation of a target. Furthermore, additional dynamic effects may be introduced. For example, by connecting the JEM modulator 190 to the nose photo diode 188, a JEM effect may be introduced to any interrogating radar when the nose of the decoy is viewed.

Figure 7:
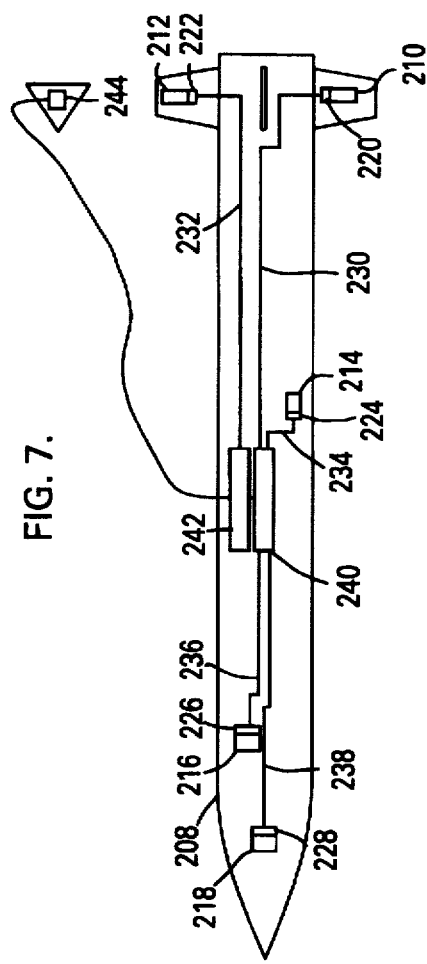
FIG. 7 is an illustration of the preferred embodiment of the present invention which utilizes electrical delay lines.

The decoy may also be constructed with electrical delay lines in place of the optical fiber delay lines. FIG. 7 illustrates a decoy of the preferred embodiment of the present invention in with electrical delay lines.

Multiple receiving antenna (210, 212, 214, 216, 218) are attached to the decoy 208. Each antenna (210, 212, 214, 216, 218) has an amplifier (220, 222, 224, 226, 228) in order to increase the strength of the signal received prior to transmission by the electrical delay lines (230, 232, 234, 236, 238). The electrical delay lines (230, 232, 234, 236, 238) carry the signal received by each of the antenna (210, 212, 214, 216, 218) to a signal combiner 240, which coherently adds the electrical signals. This coherently added signal is then amplified by a broad band amplifier 242, delivered to the transmission antenna 244 with a tow line 246 containing an electrical transmission line, and transmitted by the transmission antenna 244. It should be noted, that additional dynamic effects, such as JEM, may be introduced by connecting a JEM modulator to one of the receiving antenna, as previously described.

Those skilled in the art can now appreciate from the foregoing description that the broad teachings of the present invention can be implemented in a variety of forms. Therefore, while this invention has been described with particular examples thereof, the true scope of the invention should not be so limited since other modifications will become apparent to the skilled practitioner upon a study of the drawings, specification, and following claims.

What is claimed is:

1. A decoy for simulating an aircraft to a radar having an interrogating signal, comprising:

a plurality of antenna attached to said decoy, each of said plurality of antenna independently capable of receiving said interrogating signal;

a plurality of delay lines for transmitting the interrogating signal received by said plurality of antenna;

a combiner coherently adding said interrogating signals transmitted by said plurality of delay lines and producing a coherent signal; and a transmission antenna emitting said coherent signal which is a simulated radar signature of an aircraft.

2. The decoy of claim 1, wherein one of said plurality of antenna is attached to the nose of said decoy in order to represent a discrete radar scattering point of said aircraft.

3. The decoy of claim 1, wherein one of said plurality of antenna is attached to the tail of said decoy in order to represent a discrete radar scattering point of said aircraft.

4. The decoy of claim 1, wherein one of said plurality of antenna is attached to a wing of said decoy in order to represent a discrete radar scattering point of said aircraft.

5. The decoy of claim 1, wherein said plurality of delay lines are optical fiber delay lines.

6. The decoy of claim 1, further comprising an electro-optic modulator for converting the interrogating signal into a microwave modulated light signal which is transmitted by a optical fiber delay lines.

7. The decoy of claim 1, further comprising a photo diode for converting said microwave modulated light signal into a microwave electrical signal prior to addition by said coherent combiner.

8. The decoy of claim 1, wherein said coherent signal contains a scintillating return element.

9. The decoy of claim 1, further comprising a Jet Engine Modulation (JEM) modulator adding a JEM signal to said interrogating signals added by said combiner.

10. The decoy of claim 9, wherein said JEM modulator is added to the interrogating signal received by said antenna located on the nose of said decoy.

11. The decoy of claim 1, wherein said transmission antenna is towed behind said decoy.

12. The decoy of claim 1, wherein said plurality of delay lines are electrical delay lines.

13. The decoy of claim 12, further comprising a amplifier for increasing the strength of the interrogating signal received prior to transmission by said electrical delay lines.

14. A photonic radar decoy for simulating an aircraft to a radar having an interrogating signal, comprising:

a plurality of antenna attached to said photonic radar decoy, each of said plurality of antenna independently capable of receiving said interrogating signal;

a plurality of electro-optic modulators, each electro-optic modulator connected to an antenna and generating a microwave-modulated light signal;

a plurality of optical fiber delay lines for receiving the microwave-modulated light signals;

a plurality of photo diodes receiving the microwave-modulated light signals transmitted by said plurality of optical fiber delay lines, said plurality of photo diodes converting said plurality of microwave-modulated light signals to a plurality of microwave electrical signals;

a microwave power combiner coherently adding said plurality of microwave electrical signals and producing a coherent microwave signal;

a microwave amplifier receiving said coherent microwave signal and producing an amplified coherent microwave signal; and a transmission antenna emitting said amplified coherent microwave signal which is a simulated radar signature of an aircraft.

15. The decoy of claim 14, further comprising a Jet Engine Modulation (JEM) modulator connected to at least one of said plurality of photo diodes, said JEM modulator adding a JEM signal to said plurality of microwave electrical signals added by said combiner.

16. The decoy of claim 14, wherein said transmission antenna is towed behind said decoy.

17. A method of simulating an aircraft signature to a radar having an interrogating signal, comprising the steps of:

(a) receiving said interrogating signal with a plurality of antenna attached to a decoy;

(b) transmitting said interrogating signal received by each of said plurality of antenna with a delay line;

(c) coherently adding said signals transmitted by said delay lines; and (d) transmitting said coherently added signals to simulate a full-scale aircraft.

18. The method of claim 17, further comprising the step of coherently adding a (Jet Engine Modulation) JEM signal with said signals transmitted by said delay lines.

19. The method of claim 17, further comprising the step of modulating said interrogating signal thereby producing a light signal for transmission by said delay line.

20. The method of claim 17, further comprising the step of towing a transmitting antenna from which said coherently added signals are transmitted.

21. The method of claim 17, further comprising the step of amplifying said coherently added signals prior to said transmission of said coherently added signals.

22. A decoy for simulating an aircraft to a radar having an interrogating signal, comprising:

a receiving antenna for receiving said interrogating signal;

a signal splitter for dividing said interrogating signal received by said receiving antenna;

a plurality of delay lines transmitting said divided interrogating signal; and a plurality of a transmission antenna emitting said divided interrogating signal transmitted by said plurality of delay lines, resulting in a simulated radar signature of an aircraft.

23. The decoy of claim 22, further comprising a Jet Engine Modulation (JEM) modulator adding a JEM signal to one of said transmission antenna.

24. The decoy of claim 22, wherein said JEM modulator is added to said transmission antenna located on the nose of said decoy.

25. The decoy of claim 22, wherein said receiving antenna is towed behind said decoy.

* * * * *